US012075730B2

(12) United States Patent
Robertson

(10) Patent No.: US 12,075,730 B2
(45) Date of Patent: Sep. 3, 2024

(54) OFFSET CONCAVE THRESHING BARS

(71) Applicant: Brian G. Robertson, Frisco, TX (US)

(72) Inventor: Brian G. Robertson, Frisco, TX (US)

( * ) Notice: Subject to any disclaimer, the term of this patent is extended or adjusted under 35 U.S.C. 154(b) by 0 days.

(21) Appl. No.: 18/376,638

(22) Filed: Oct. 4, 2023

(65) Prior Publication Data
US 2024/0023486 A1 Jan. 25, 2024

Related U.S. Application Data

(63) Continuation-in-part of application No. 17/961,102, filed on Oct. 6, 2022, and a continuation-in-part of application No. 29/849,073, filed on Aug. 8, 2022, said application No. 17/961,102 is a continuation of application No. 16/826,194, filed on Mar. 21, 2020, now Pat. No. 11,464,169, which is a continuation-in-part of application No. 29/680,208, filed on Feb. 14, 2019, now Pat. No. Des. 954,759, and a continuation-in-part of application No. 29/670,114, filed on Nov. 13, 2018, now Pat. No. Des. 949,930, which is a continuation of application No. 16/159,431, filed on Oct. 12, 2018, now abandoned, said application No. 16/826,194 is a continuation-in-part of application No. 16/115,331, filed on Aug. 28, 2018, now Pat. No. 10,785,916, said application No. 29/670,114 is a continuation of application No. 16/115,331, filed on Aug. 28, 2018, now Pat. No. 10,785,916, which is a continuation-in-part of application No. 15/856,381, filed on Dec. 28, 2017, now Pat. No. 10,716,260, said application No. 29/670,114 is a continuation of application No. 15/856,381, filed on Dec. 28, 2017, now Pat. No. 10,716,260, and a continuation of application No. 15/856,402, filed on Dec. 28, 2017,
(Continued)

(51) Int. Cl.
*A01F 12/24* (2006.01)
*A01F 7/04* (2006.01)
*A01F 7/06* (2006.01)
*A01F 12/26* (2006.01)

(52) U.S. Cl.
CPC .............. *A01F 12/24* (2013.01); *A01F 7/04* (2013.01); *A01F 7/06* (2013.01); *A01F 12/26* (2013.01)

(58) Field of Classification Search
CPC .... A01F 12/24; A01F 7/04; A01F 7/06; A01F 12/26
See application file for complete search history.

(56) References Cited

U.S. PATENT DOCUMENTS 4,075,823 A * 2/1978 Rowland-Hill ........... A01F 7/06
460/80
4,192,322 A * 3/1980 Wilson ..................... A01F 7/06
460/70
(Continued)

*Primary Examiner* — Arpad Fabian-Kovacs
(74) *Attorney, Agent, or Firm* — Law Office of Sam Sokhansanj PLLC

(57) ABSTRACT

A concave for a combine harvester is disclosed having a first side support member and a second side support member, and a threshing bar secured to the first and second side support members, wherein the threshing bar is at a non-perpendicular angle relative to the first and second side support members. The threshing bar may be disposed between the first and second side support members.

11 Claims, 14 Drawing Sheets

Related U.S. Application Data now Pat. No. 11,134,613, said application No. 16/115,331 is a continuation-in-part of application No. 15/856,402, filed on Dec. 28, 2017, now Pat. No. 11,134,613.

(60) Provisional application No. 62/821,570, filed on Mar. 21, 2019.

(56) References Cited

U.S. PATENT DOCUMENTS

| | | | | |
|---|---|---|---|---|
| 4,383,652 | A * | 5/1983 | Osborne | B02C 18/144 |
| | | | | 241/222 |
| D624,939 | S * | 10/2010 | Flickinger | D15/28 |
| 8,454,416 | B1 * | 6/2013 | Estes | A01F 12/24 |
| | | | | 460/107 |
| D735,772 | S * | 8/2015 | Ricketts | A01F 12/26 |
| | | | | D15/28 |
| 10,412,895 | B2 * | 9/2019 | Theisen | A01F 12/28 |
| D954,759 | S * | 6/2022 | Robertson | D15/28 |
| D990,525 | S * | 6/2023 | Robertson | D15/28 |
| 2018/0359926 | A1 * | 12/2018 | Estes | A01F 11/06 |
| 2018/0368325 | A1 * | 12/2018 | Koudela | A01F 12/24 |
| 2019/0166767 | A1 * | 6/2019 | Robertson | A01F 12/26 |

* cited by examiner

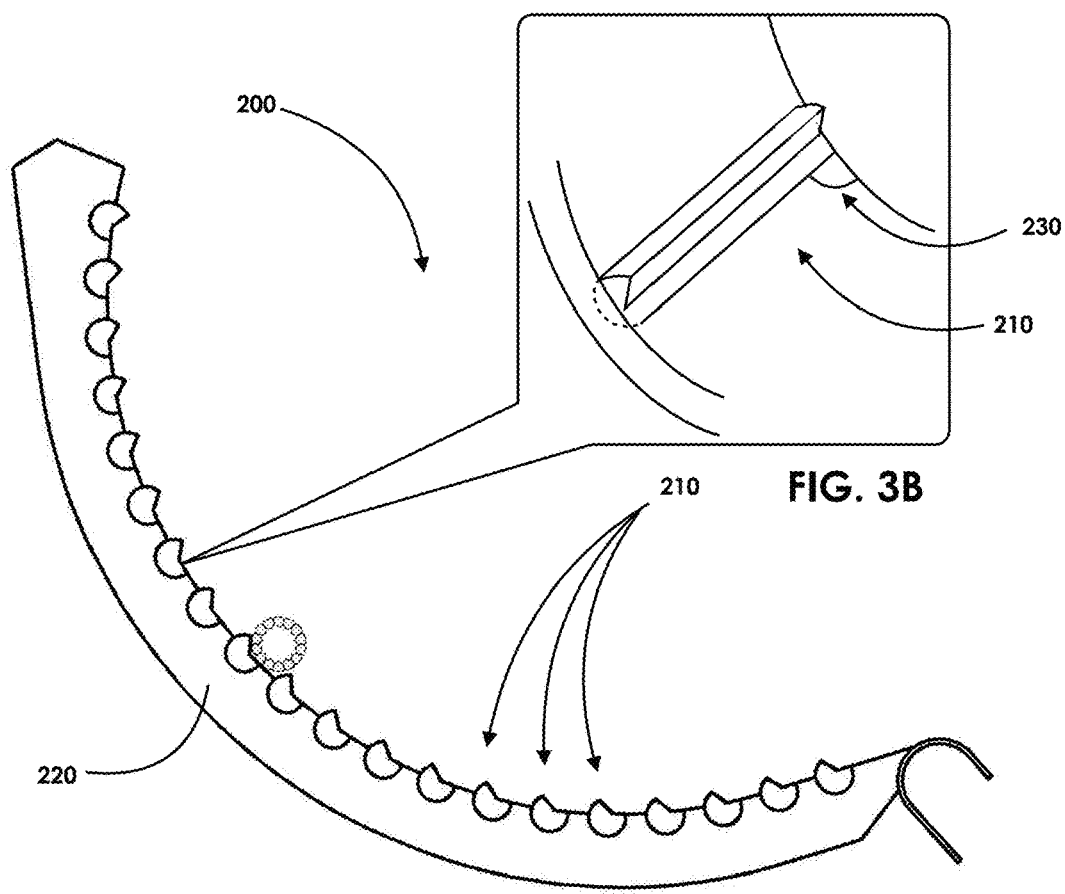
FIG. 3B
FIG. 3A
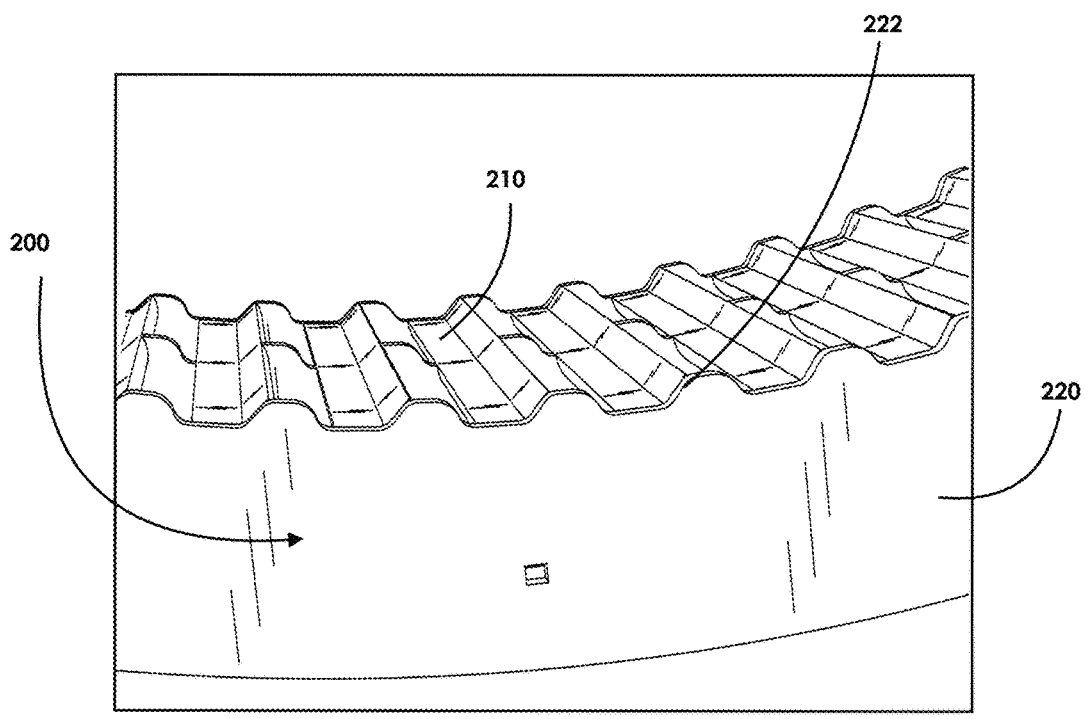
FIG. 3C

OFFSET CONCAVE THRESHING BARS

CROSS REFERENCE TO RELATED APPLICATIONS

This application is a continuation-in-part (CIP) of U.S. Non-Provisional application Ser. No. 17/961,102 filed on Oct. 6, 2022, which is incorporated herein by reference in its entirety, which is a continuation of U.S. Non-Provisional application Ser. No. 16/826,194 filed on Mar. 21, 2020, which is incorporated herein by reference in its entirety, which claims the benefit of U.S. Provisional Application No. 62/821,570 filed on Mar. 21, 2019, which is incorporated herein by reference. This application is also a CIP of U.S. Non-Provisional application Ser. No. 16/115,331 filed on Aug. 28, 2018, which is incorporated herein by reference in its entirety, which is a CIP of U.S. Non-Provisional application Ser. No. 15/856,381 filed on Dec. 28, 2017, which is incorporated herein by reference in its entirety, and a CIP of U.S. Non-Provisional application Ser. No. 15/856,402, filed on Dec. 28, 2017, which is incorporated herein by reference in its entirety. This application is also a CIP of U.S. Design patent application Ser. No. 29/680,208 filed on Feb. 14, 2019, which is incorporated herein by reference in its entirety. This application is also a CIP of U.S. Design patent application Ser. No. 29/670,114 filed on Nov. 13, 2018, which is incorporated herein by reference in its entirety, which is a continuation of U.S. Non-Provisional application Ser. No. 16/159,431 filed on Oct. 12, 2018, which is a continuation of U.S. Non-Provisional application Ser. No. 16/115,331 filed on Aug. 28, 2018, which is a continuation of U.S. Non-Provisional application Ser. No. 15/856,381 filed on Dec. 28, 2017, which is a continuation of U.S. Non-Provisional application Ser. No. 15/856,402, filed on Dec. 28, 2017.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

A combine harvester is a machine that is used to harvest grain and seed crops. The objective is to complete several processes, which traditionally were distinct, in one pass of the machine over a particular part of the field. Among the crops that may be harvested with a combine can include but is not limited to wheat, oats, rye, peas, edible beans, barley, corn, soybeans, and flax or linseed. The waste (e.g., straw) left behind on the field includes the remaining stems and leaves of the crop having limited nutrients which may be, for example, chopped and spread on the field or baled for feed and bedding for livestock. Generally, the combine harvester includes a header, which removes the crop from a field, and a feeder housing which transports the crop matter into a threshing rotor. The process of threshing is removing the grain or seed from the crop. The threshing rotor can include one or more rotors which can extend axially (front to rear) or transversely within the body of the combine, and which are partially or fully surrounded by one or more perforated concaves. In particular, there may be a rotor having threshing concaves with bars or wires for threshing operations of the crop, and concave grates with slots, wires or fingers for separation operations of the crop material, also known as separation concaves or separation grates. Generally, the separation grate is meant to separate any grain that is caught in material other than grain, such as chaff, straw, shucks, stalk, leafy material, among others, which may also be referred to herein as MOG.

However, current conventional concave bars and separation grates have certain configurations that are not optimized to minimize grain damage while simultaneously maximizing threshing and separating of the crop material, thereby resulting in inefficient harvesting, damaged, and wasted crop. In one example of traditional combine concaves, if a combine harvester has three concaves, then a crop that is threshed in a first concave, has a two-third probability for the threshed grains to fall through the concave openings. However, if the crop does not get threshed until the second concave, then it only has a one-third probability for the threshed grains to fall through the concave openings. Further, if the crop is not threshed in the second concave, then the third concave can become overloaded with crop and grain material and operating at over capacity, thus resulting in the grain being discharged out the back of the combine and resulting in very inefficient harvesting.

What is needed is a concave bar configuration that optimizes the surface area of the dihedral faces of concave threshing bars that have certain threshing angles and surface areas that minimize grain damage while maximizing threshing effectiveness, in addition to concave bar configurations that are at an angle relative to the side rails or side support members of the concave.

BRIEF SUMMARY

In one aspect of the disclosure described herein, a concave bar configuration for a combine harvester is disclosed that optimizes the surface area of the dihedral faces of concave threshing bars that have certain threshing angles and surface areas that minimize grain damage while maximizing threshing effectiveness, in addition to concave bar configurations that are at an angle relative to the side rails or side support members of the concave, among other advantages.

In another aspect of the present disclosure described herein, a concave for a combine harvester is disclosed having a first side support member and a second side support member, and a threshing bar secured to the first and second side support members, wherein the threshing bar is at a non-perpendicular angle relative to the first and second side support members. The threshing bar may be disposed between the first and second side support members. In addition, the threshing bar may include a cut-out, groove, or channel substantially extending its length. Further, the first and second side members may include a top surface that substantially axially aligns with the cut-out, flute, groove, or channel of the threshing bar. Also, the threshing bar may include an angle in the range of about 25-degrees to about 87-degrees relative to the first or second side support member. Also, the threshing bar may include an angle of about 83-degrees relative to the first or second side support member.

Further, the threshing bar may include an angle of about 87-degrees relative to the first or second side support member. Also, the threshing bar may include an angle of about 79-degrees relative to the first or second side support member. Moreover, the threshing bar may include a first face and a second face. Further, the first and second face of the threshing bar may be of varying dihedral angles. Also, the surface area of the first face of the threshing bar may be about 130% larger or about 1.3 times larger relative to the surface area of the second face of the threshing bar. Also, the surface area of the first face of the threshing bar may be about 170% larger or about 1.7 times larger relative to the surface area of the second face of the threshing bar. Further, the surface area of the first face of the threshing bar may be about 101% to 199% larger or about 1.01 times up to 1.99 times larger relative to the surface area of the second face of the threshing bar.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 3A illustrates a cross-sectional side view of the concave of the present disclosure described herein.

FIG. 3B illustrates a partial close-up perspective view of the concave of the present disclosure described herein.

FIG. 3C illustrates a partial perspective view of the concave of the present disclosure described herein.

DETAILED DESCRIPTION

Figure 1:
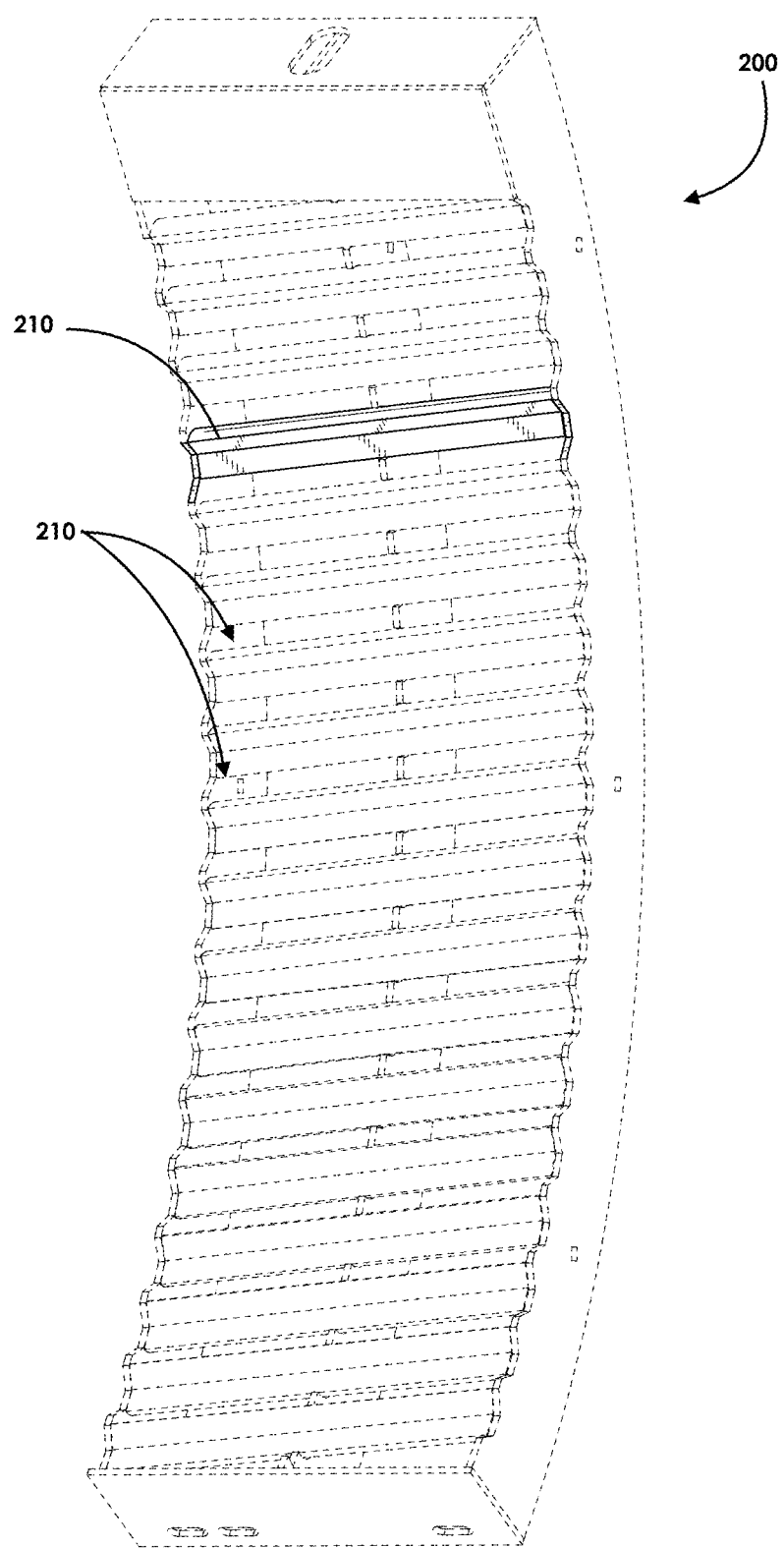
FIG. 1 illustrates a perspective view of a concave according to one non-limiting exemplary embodiment of the present disclosure described herein.
Figure 2A:
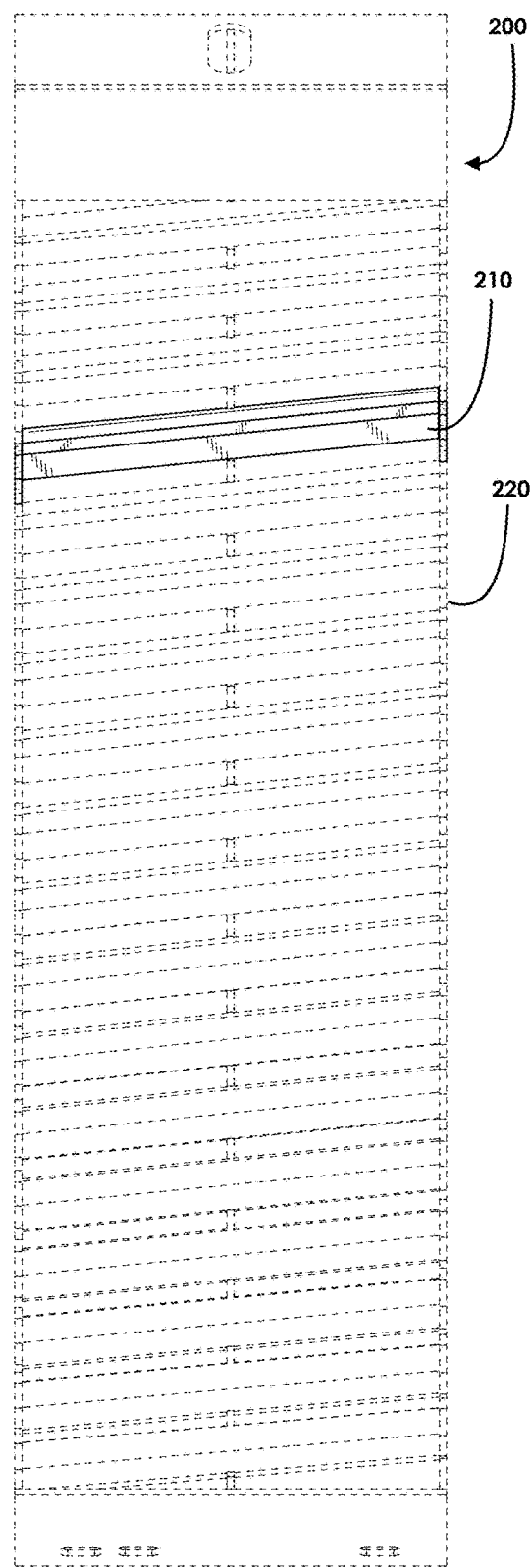
FIG. 2A illustrates a top view of the concave of the present disclosure described herein.
Figure 2B:
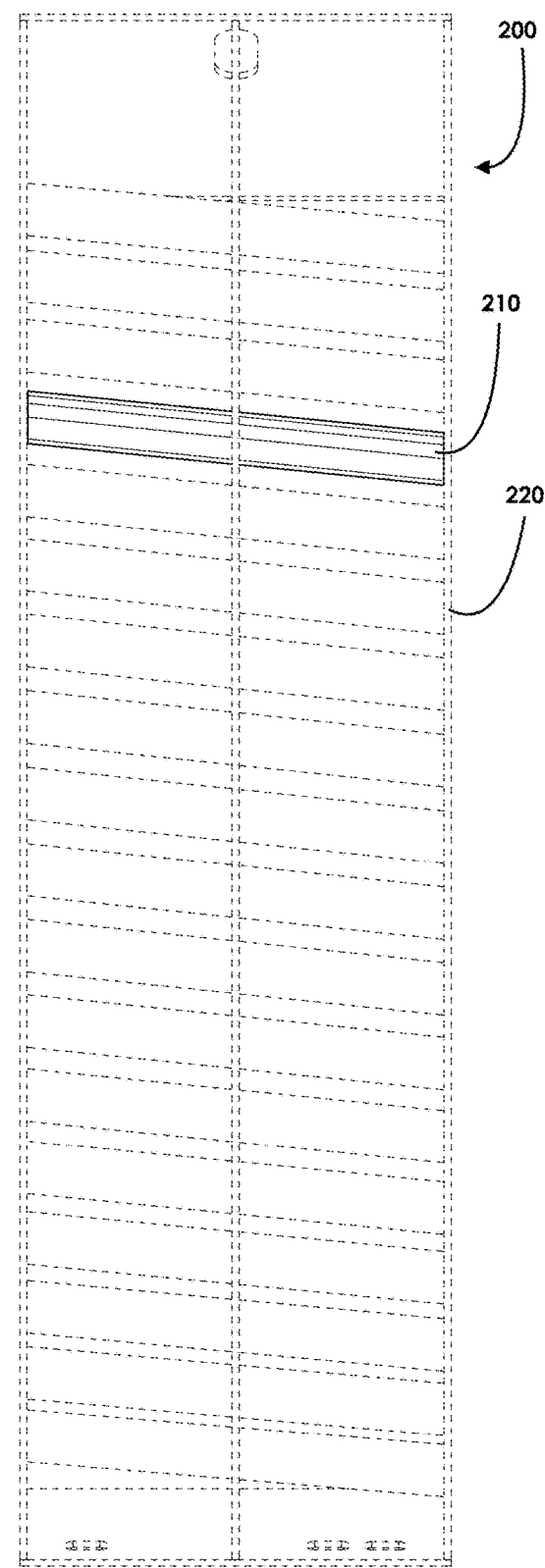
FIG. 2B illustrates a bottom view of the concave of the present disclosure described herein.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

FIGS. 1A-3C illustrate various views for one non-limiting exemplary embodiment of a concave frame assembly 200 with concave bars 210 disposed between a pair of side rails 220, wherein the side rails may also be referred to herein as side support members or side frames. As used herein, a threshing bar can be any type of threshing member or elongated rigid member. As disclosed herein, references to top or bottom faces of the threshing bars 210 may also be interpreted as first or second faces of the threshing bars, wherein the first and second faces are formed via a cutout, groove, flute, trough, channel, or notch that extends the entire length (or a substantial length) of each bar 210. As shown, bars 210 are secured to the concave frame 200 at an angle 230 relative to the side rails 220. In addition, each side rail 220 may also have an upper surface region 222 that substantially aligns with the first and second faces of each bar 210.

Figure 4A:
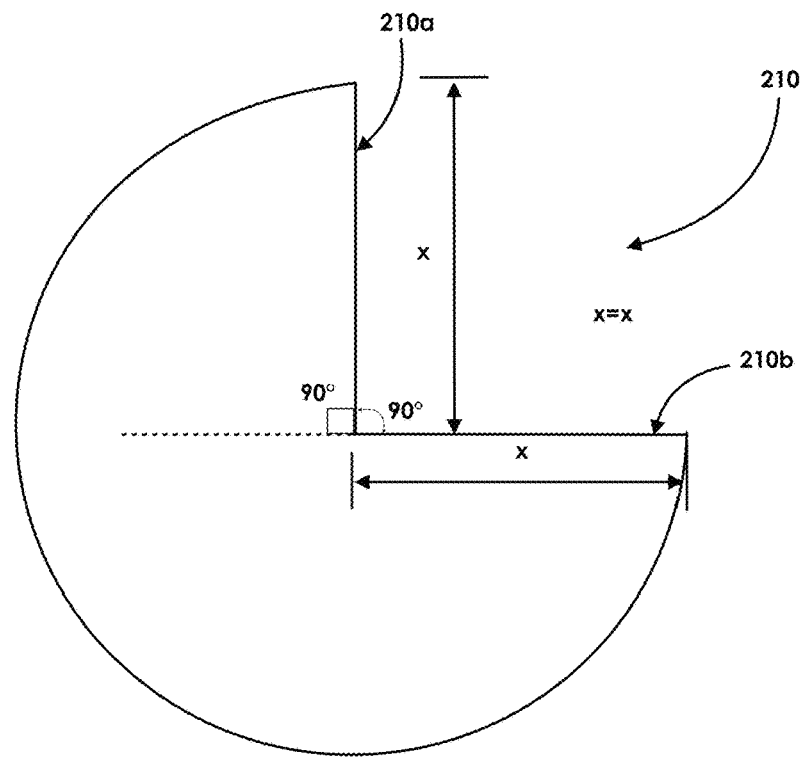
FIG. 4A illustrates a cross-sectional side view of a concave bar of the present disclosure described herein, according to one non-limiting exemplary embodiment.
Figure 4B:
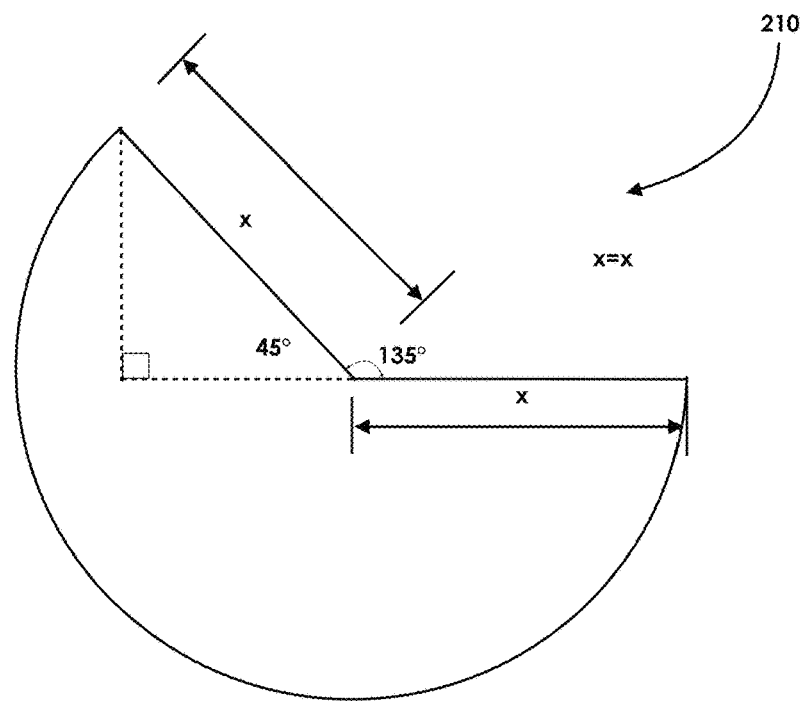
FIG. 4B illustrates a cross-sectional side view of a concave bar of the present disclosure described herein, according to another non-limiting exemplary embodiment.
Figure 5A:
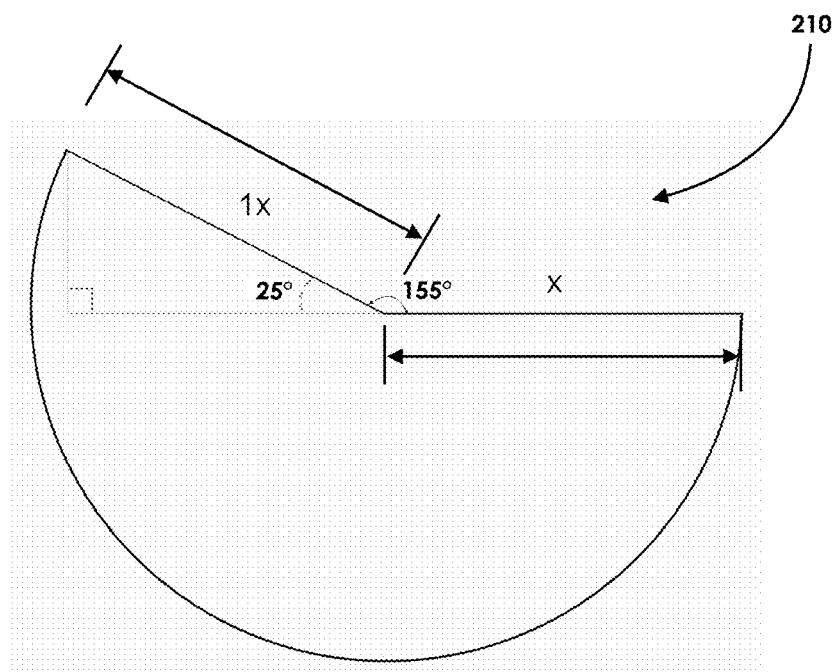
FIG. 5A illustrates a cross-sectional side view of a concave bar of the present disclosure described herein, according to another non-limiting exemplary embodiment.
Figure 5B:
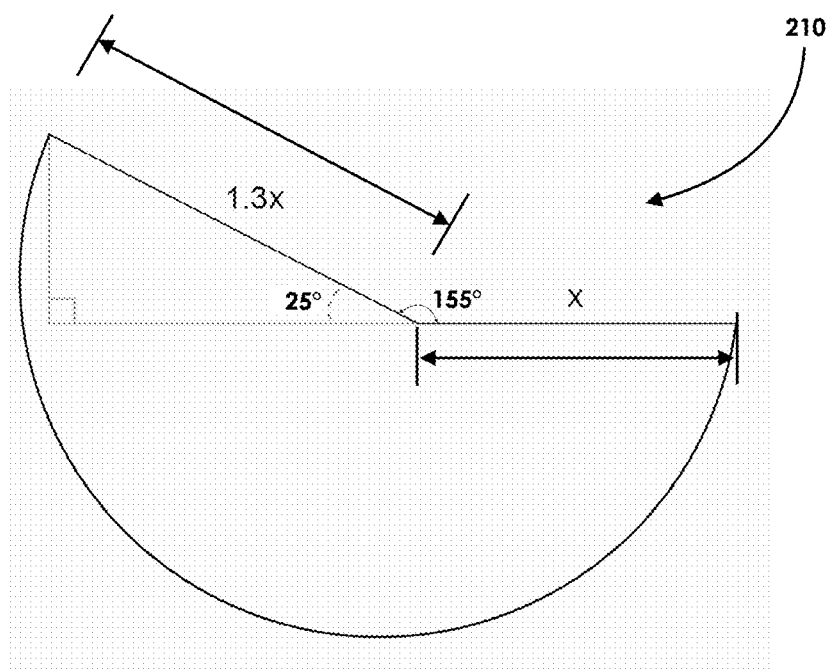
FIG. 5B illustrates a cross-sectional side view of a concave bar of the present disclosure described herein, according to another non-limiting exemplary embodiment.
Figure 6A:
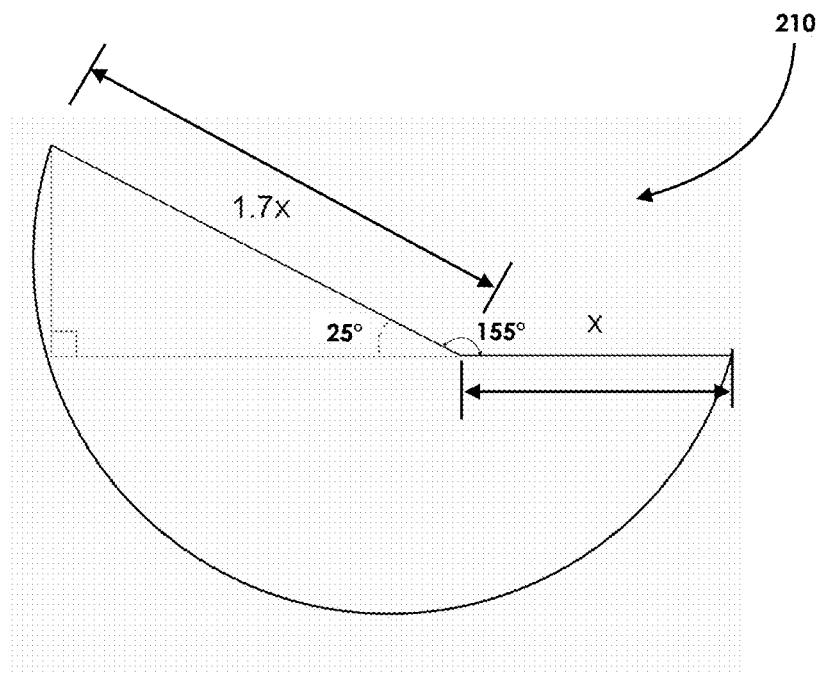
FIG. 6A illustrates a cross-sectional side view of a concave bar of the present disclosure described herein, according to another non-limiting exemplary embodiment.

FIG. 4AC illustrates an about 90-degree concave bar having equal first face (210a) and second face (210b) surface areas or heights/widths (x). FIG. 4B illustrates an about 45-degree concave bar 210 (or about 135-degree) having substantially equal top and bottom surface areas or heights/widths (x). FIG. 5A illustrates concave bar 210 having an about 25-degree angle (or about 155-degree) and both the top and bottom surfaces each having substantially equal surface areas or height/widths (x). FIG. 5B illustrates concave bar 210 having an about 25-degree angle (or about 155-degree) and having a top face surface area or height/width that is about 1.3× (130%) larger than the bottom face surface area or height/width (x). FIG. 6A illustrates concave bar 210 having an about 25-degree angle (or about 155-degree) with a top face surface area or height/width that is about 1.7× (170%) larger than the bottom face surface area or height/width (x).

Figure 6B:
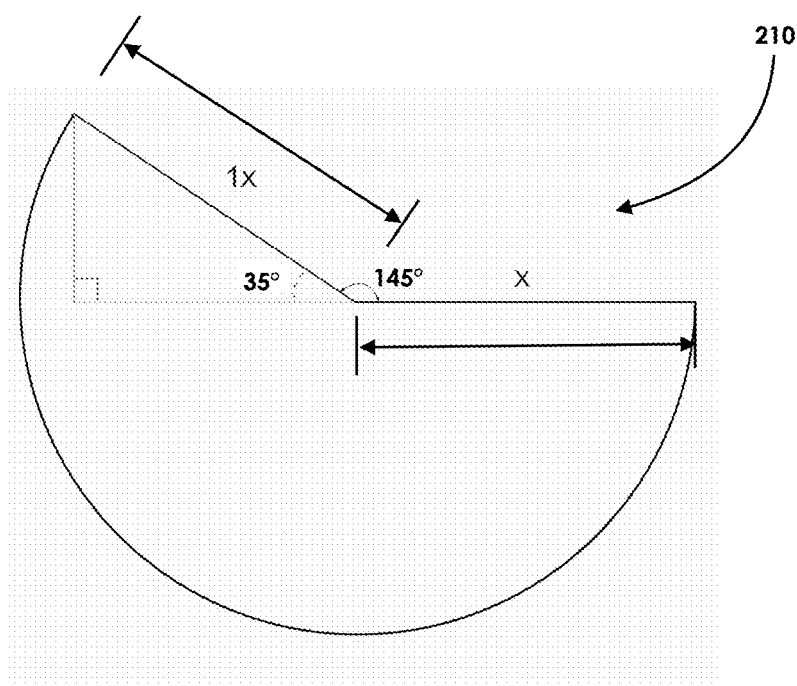
FIG. 6B illustrates a cross-sectional side view of a concave bar of the present disclosure described herein, according to another non-limiting exemplary embodiment.
Figure 7A:
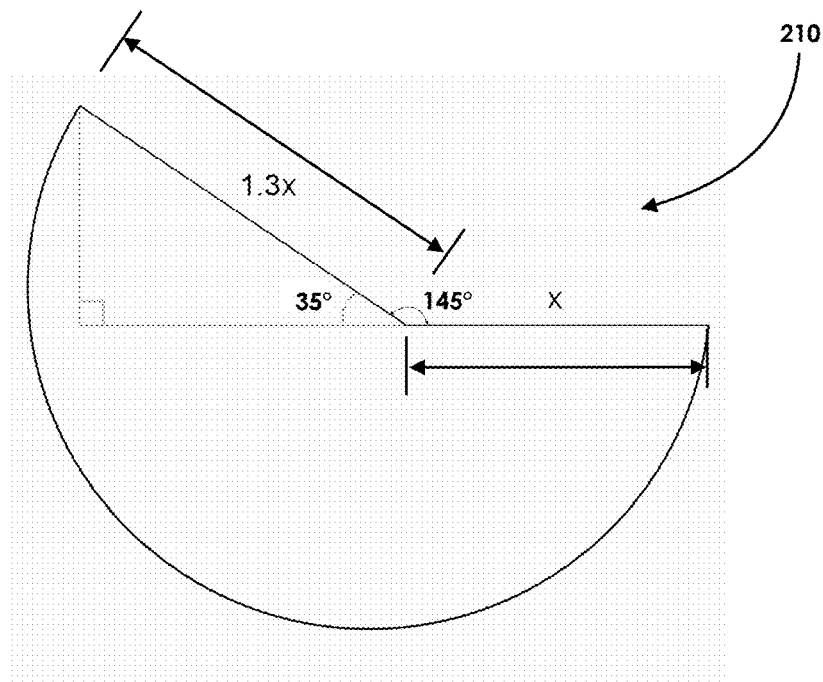
FIG. 7A illustrates a cross-sectional side view of a concave bar of the present disclosure described herein, according to another non-limiting exemplary embodiment.
Figure 7B:
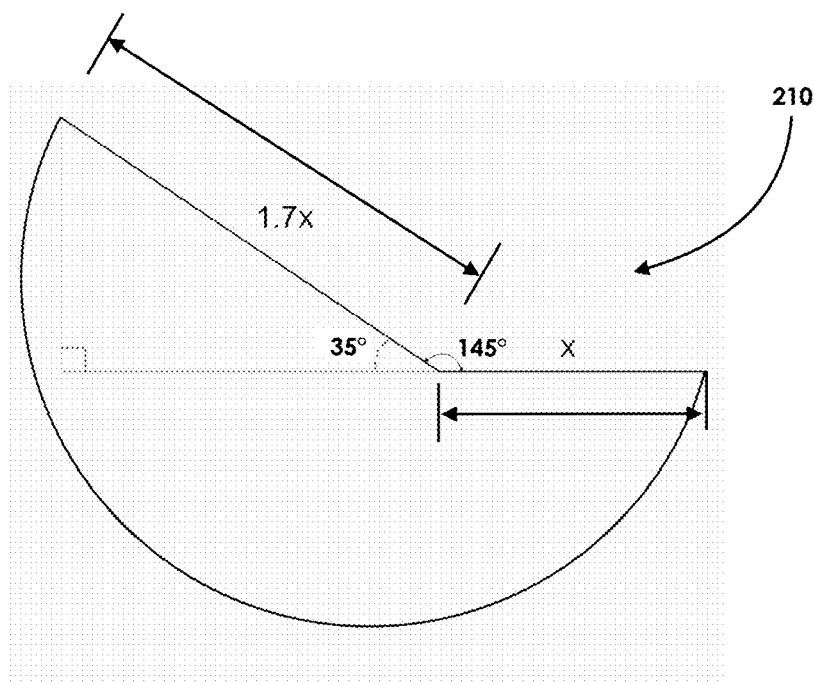
FIG. 7B illustrates a cross-sectional side view of a concave bar of the present disclosure described herein, according to another non-limiting exemplary embodiment.
Figure 8A:
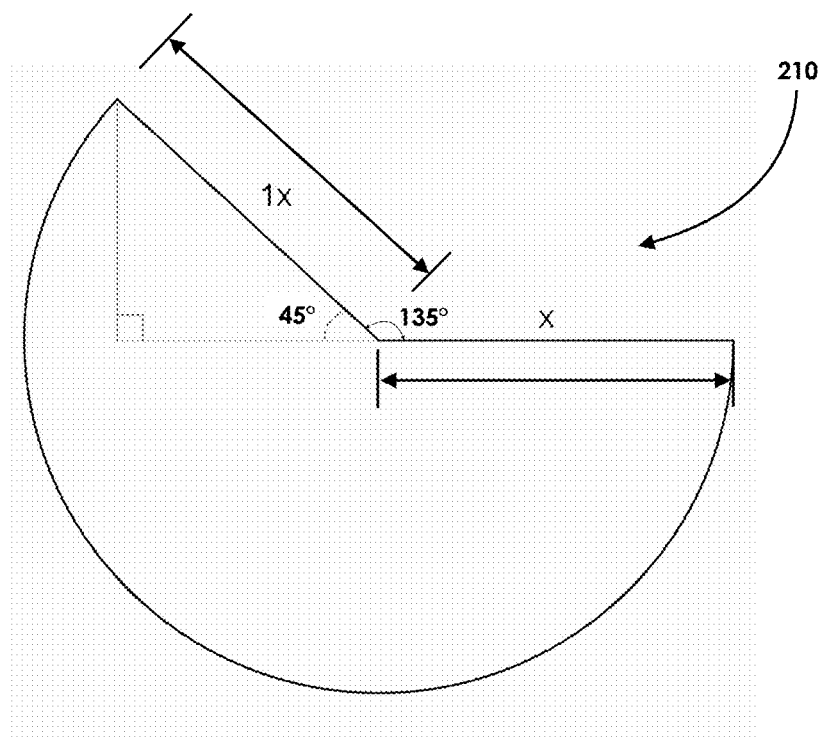
FIG. 8A illustrates a cross-sectional side view of a concave bar of the present disclosure described herein, according to another non-limiting exemplary embodiment.
Figure 8B:
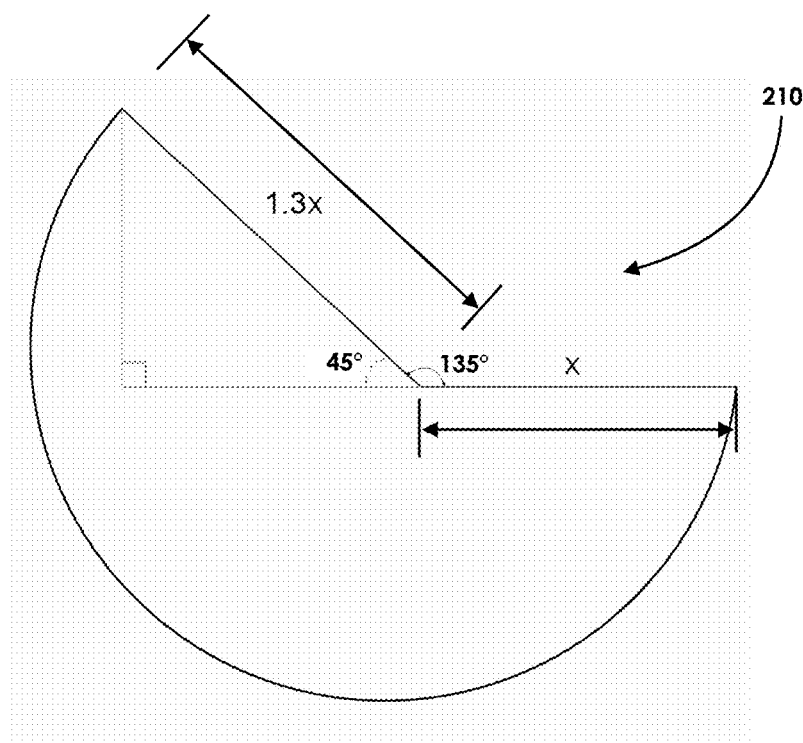
FIG. 8B illustrates a cross-sectional side view of a concave bar of the present disclosure described herein, according to another non-limiting exemplary embodiment.
Figure 9:
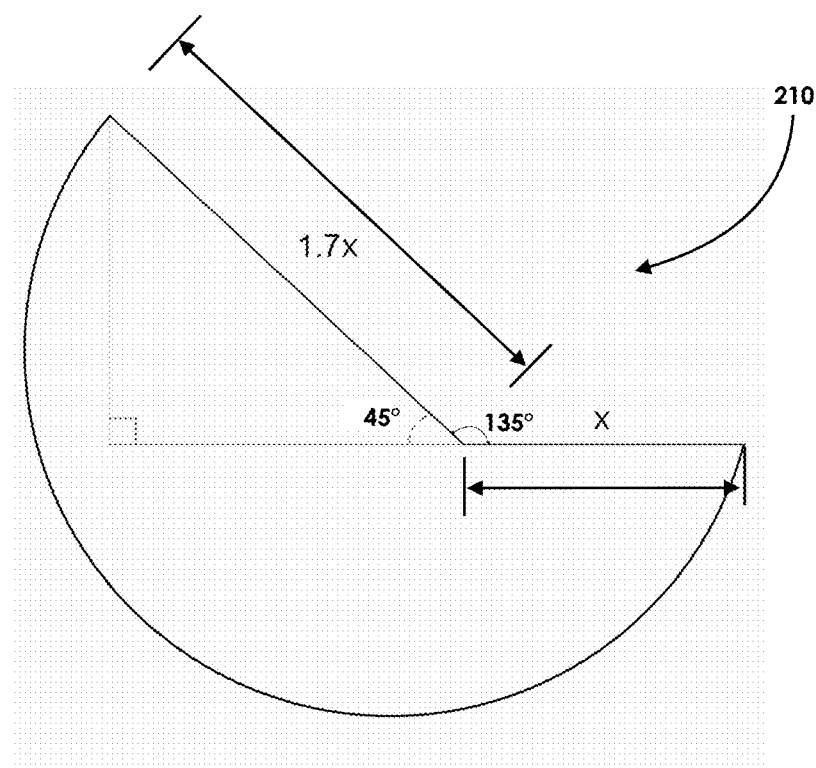
FIG. 9 illustrates a cross-sectional side view of a concave bar of the present disclosure described herein, according to another non-limiting exemplary embodiment.

FIG. 6B illustrates concave bar 210 having an about 35-degree angle (or about 145-degree) with a top surface area height/width (x) that is equal to its bottom surface area or height/width (x). FIG. 7A illustrates concave bar 210 having an about 35-degree angle (or about 145-degree) with a top face surface area or height/width that is about 1.3× (130%) larger than its bottom face surface area or height/width (x). FIG. 7B illustrates concave bar 210 having an about 35-degree angle (or about 145-degree) with a top surface area or height/width that is about 1.7× (170%) larger than its bottom face surface area or height/width (x). FIG. 8A illustrates concave bar 210 having an about 45-degree angle (or about 135-degree) with a top face surface area or height/width (x) that is equal to the bottom surface area or height/width (x). FIG. 8B illustrates concave bar 210 having an about 45-degree angle (or about 135-degree) with a top face surface area or height/width that is about 1.3× (130%) larger than the bottom face surface area or height/width (x). FIG. 9 illustrates a concave bar having an about 45-degree angle with a top face surface area or height/width that is about 1.7× (170%) larger than the bottom surface area or height/width (x).

Figure 10A:
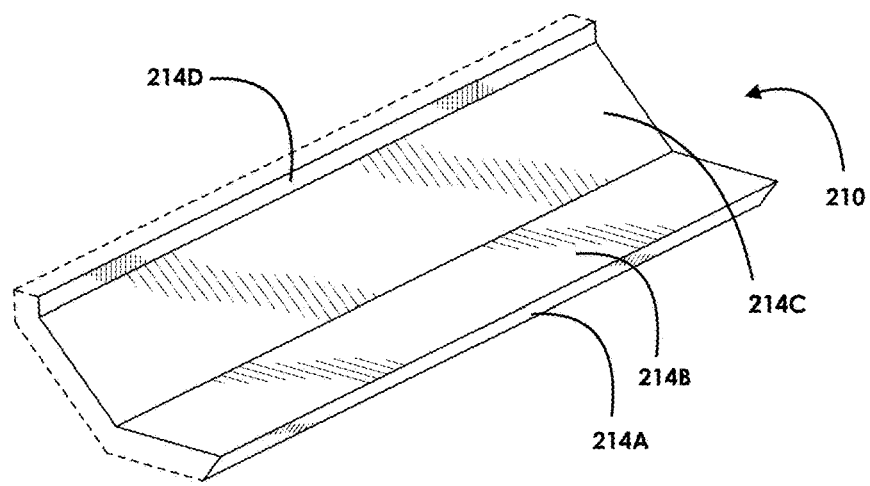
FIG. 10A illustrates a perspective view of a concave bar of the present disclosure described herein, according to another non-limiting exemplary embodiment.
Figure 10B:
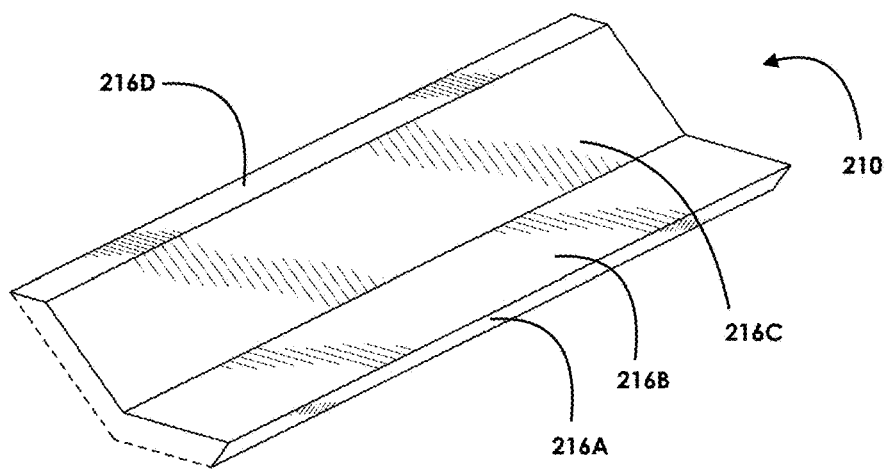
FIG. 10B illustrates a perspective view of a concave bar of the present disclosure described herein, according to another non-limiting exemplary embodiment.
Figure 10C:
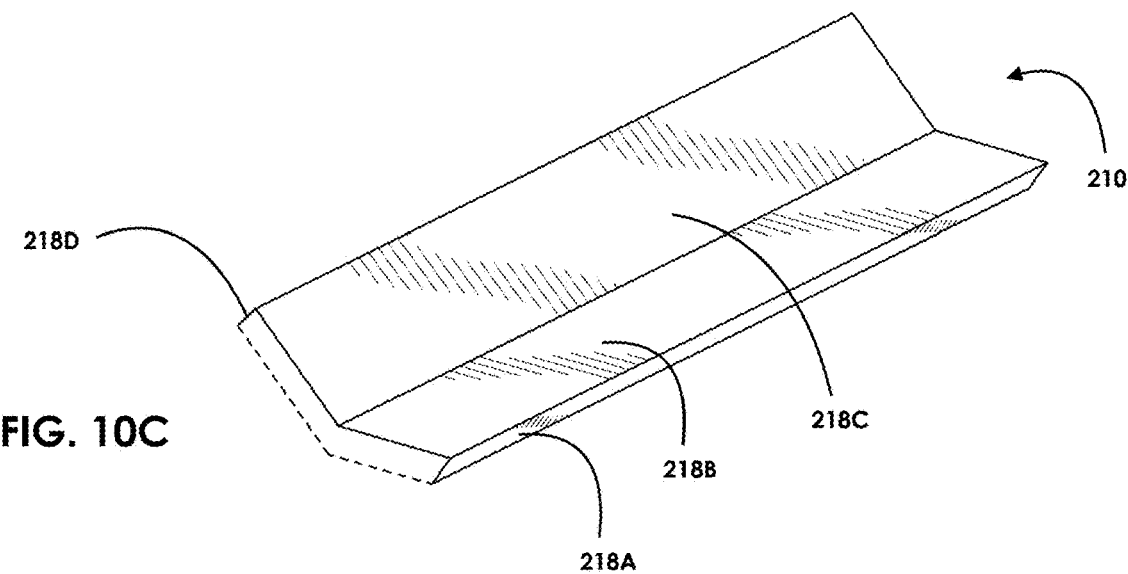
FIG. 10C illustrates a perspective view of a concave bar of the present disclosure described herein, according to another non-limiting exemplary embodiment.

FIGS. 10A-10C illustrate various embodiments for concave bar 210 having various cross-sectional configurations and surfaces or faces. In particular, FIG. 10A illustrates concave bar 210 having a first surface 214A that is at an acute angle relative to a second surface 214B which is at an obtuse angle relative to a third surface 214C which is at a further obtuse angle relative to fourth surface 214D, wherein surface 214D is in a vertical orientation. FIG. 10B illustrates concave bar 210 having first surface 216A that is at an acute angle relative to a second surface 216B which is at an obtuse angle relative to a third surface 216C which is at a further obtuse angle relative to a fourth surface 216D, wherein surface 216D is in a horizontal orientation. FIG. 10C illustrates concave bar 210 having a first surface 216A that is at an acute angle relative to a second surface 216B which is at an obtuse angle relative to a third surface 216C which is at a further obtuse angle relative to a fourth surface 216D, wherein surface 216D is in a horizontal orientation. It is contemplated within the scope of the present disclosure described herein that any of the bars 210 disclosed herein may have any cross-section configuration, including but not limited to a full or partial cylindrical, triangular, trapezoidal, hexagonal, polygonal, oval, or round cross-sectional configuration. In addition, it is contemplated within the scope of the present disclosure described herein that threshing bar 210 may be two or more pieces welded or secured together, such as face 214B being one piece secured to face 214C (FIG. 10A), among other configurations. Alternatively, the two adjacent faces of the threshing bar 210, such as 214B and 214C of FIG. 10A, may also be extruded.

Figure 11:
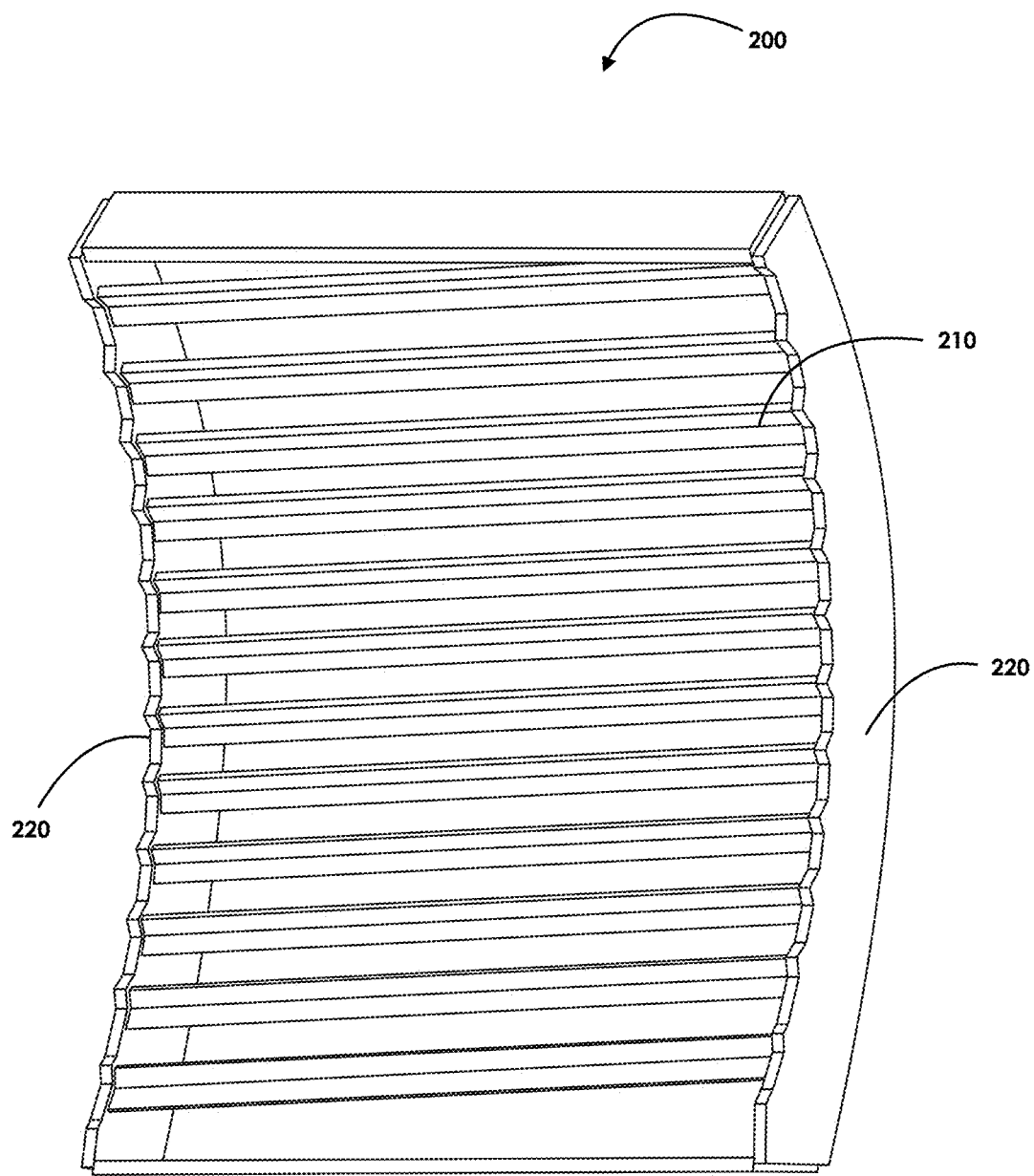
FIG. 11 illustrates a perspective view of a concave of the present disclosure described herein, according to another non-limiting exemplary embodiment.
Figures 12A, 12B:
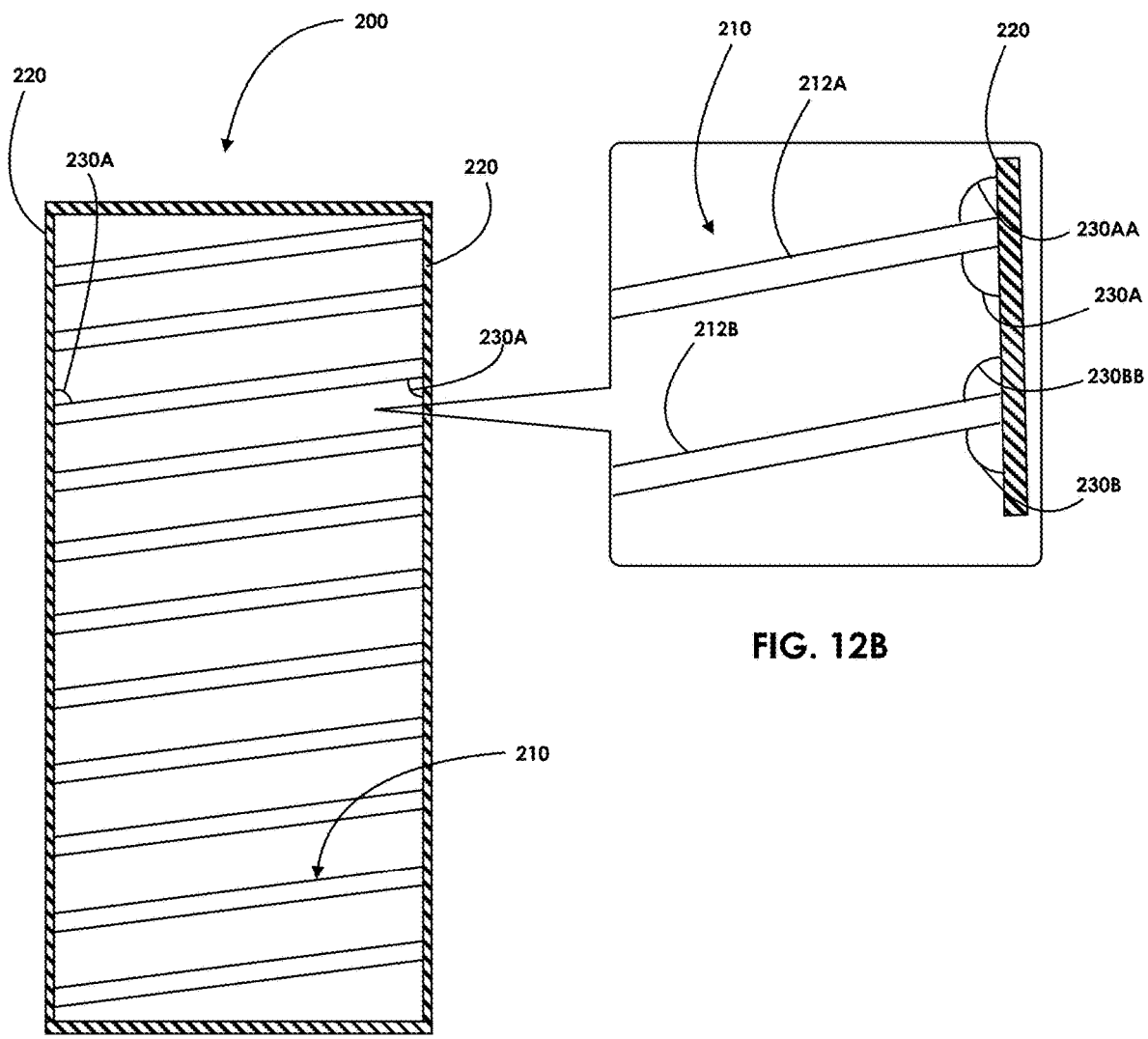
FIG. 12A illustrates a simplified top view of a concave of the present disclosure described herein, according to another non-limiting exemplary embodiment.
FIG. 12B illustrates a simplified close-up view of the concave of FIG. 12A.

FIG. 11 illustrates another non-limiting exemplary embodiment of concave frame assembly 200 having threshing bars 210 disposed between parallel side rails 220, wherein each threshing bar 210 is shown offset and at an angle relative to the side rails. FIGS. 12A-12B illustrates another non-limiting exemplary embodiment of concave frame assembly 200 having threshing bars 210 disposed between parallel side rails 220, wherein each threshing bar may have independent or uniform angles or offsets relative to side rails 220. For example, as shown in FIG. 12B, threshing bar 212A may have an angle 230A that is about 83-degrees (with a supplementary angle 230AA of 97-degrees) and threshing bar 212 may have an angle 230B that is about 87-degrees (with a supplementary angle 230BB of 93-degrees) with respect to the side rail 220 or a vertical plane. In other embodiments, angles 230A and 230B may be the identical to each other, wherein the concave 200 can have threshing bars 210 positioned at the same offset angle relative to the side rails 220. However, it is contemplated within the scope of the present disclosure described herein that either of 230A or 230B may have any angle ranging from about 25-degrees to about 90-degrees or just less than 90-degrees.

Figure 13A:
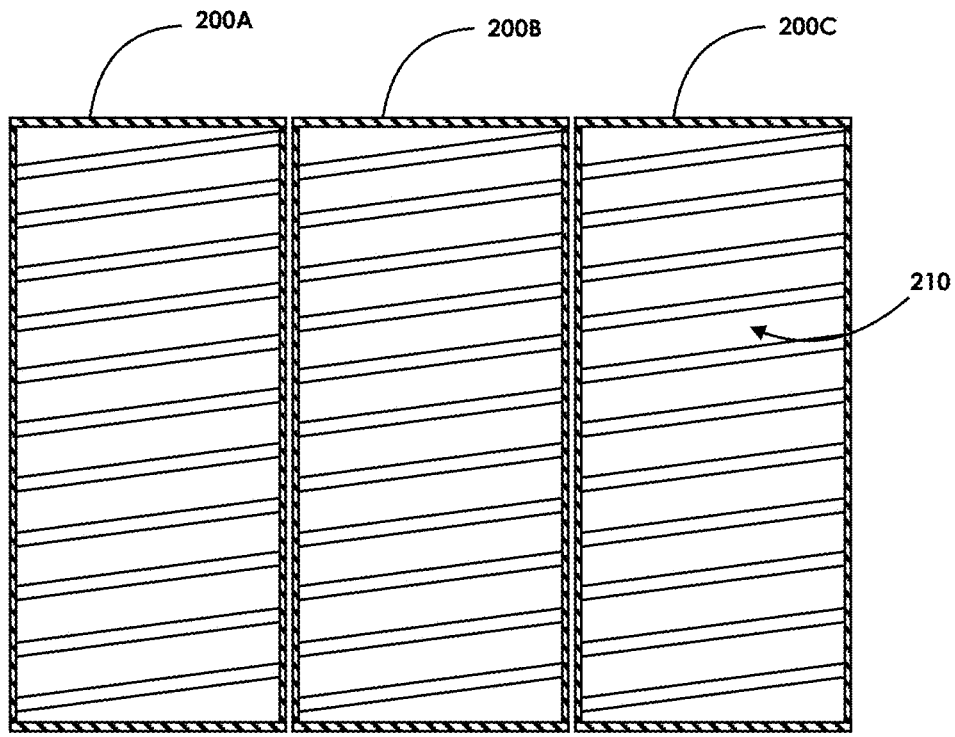
FIG. 13A illustrates a simplified top view of a concave configuration of the present disclosure described herein, according to one non-limiting exemplary embodiment.
Figure 13B:
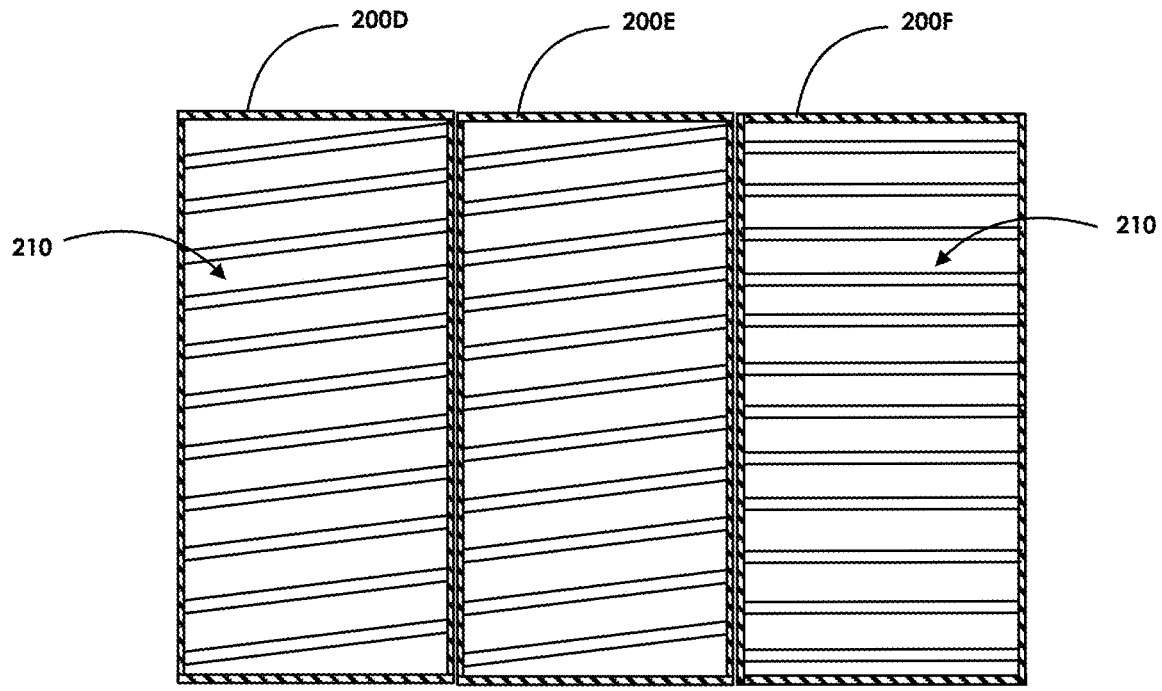
FIG. 13B illustrates a simplified top view of a concave configuration of the present disclosure described herein, according to another non-limiting exemplary embodiment.

FIG. 13A illustrates one non-limiting exemplary embodiment of concave frames 200A, 200B, and 200C having threshing bars 210 that are at the same offset or angle relative to the side rails of each concave. As shown in FIG. 13A, concaves 200A-200C are shown as installed on a combine harvester. In other embodiments, such as shown in FIG. 13B, concaves 200A, 200B, and 200C may each have threshing bars 210 that are at different angles relative to the side rails of each concave. For example, concave 200D may have its threshing bars 210 at an angle of about 70-degrees relative to its side rails, concave 200E may have its threshing bars 210 at an angle of about 83-degrees relative to its side rails, and concave 200F may have its threshing bars at an angle of about 90-degrees relative to its side rails. As shown in FIG. 13A, concaves 200A-200C are shown as installed on a combine harvester. It is contemplated within the scope of the present disclosure described herein that any of concaves 200A-200E may each have their threshing bars 210 at any angle relative the side rails and in any combination, such as angles within a range of about 1-degree to about 179-degrees, or within a range of about 25-degrees to about 90-degrees.

Figure 14A:
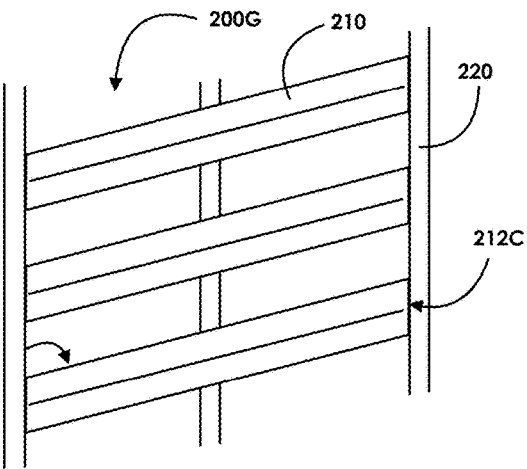
FIG. 14A illustrates a simplified partial top view of a concave configuration of the present disclosure described herein, according to one non-limiting exemplary embodiment.
Figure 14B:
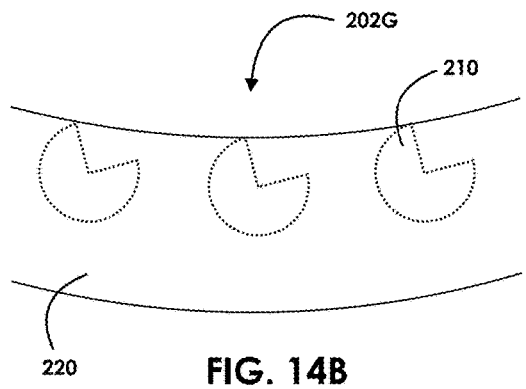
FIG. 14B illustrates a simplified partial side view of the concave configuration of FIG. 14A.
Figure 14C:
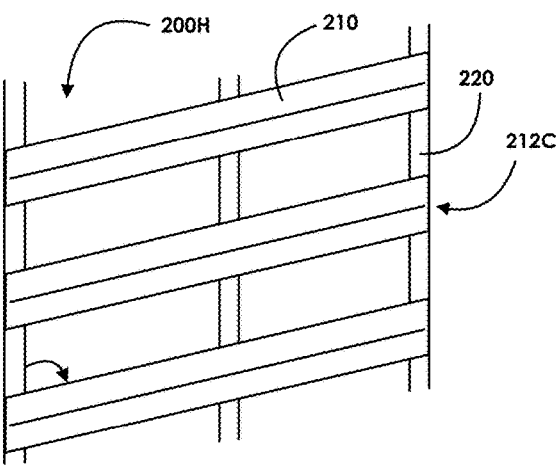
FIG. 14C illustrates a simplified partial top view of a concave configuration of the present disclosure described herein, according to another non-limiting exemplary embodiment.
Figure 14D:
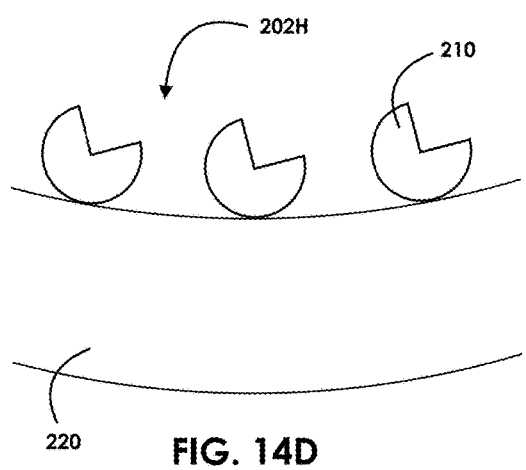
FIG. 14D illustrates a simplified partial side view of the concave configuration of FIG. 14C.
Figure 14E:
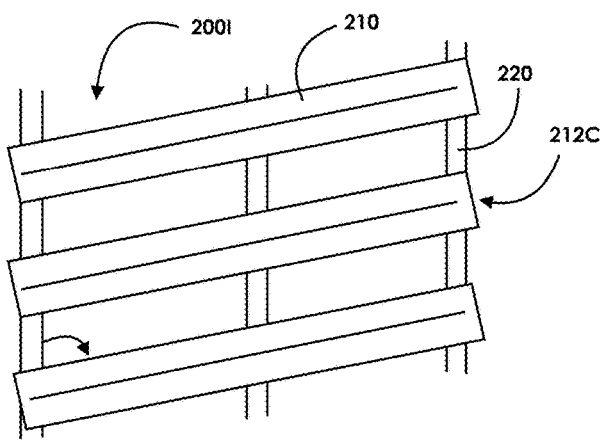
FIG. 14E illustrates a simplified partial top view of a concave configuration of the present disclosure described herein, according to another non-limiting exemplary embodiment.
Figure 14F:
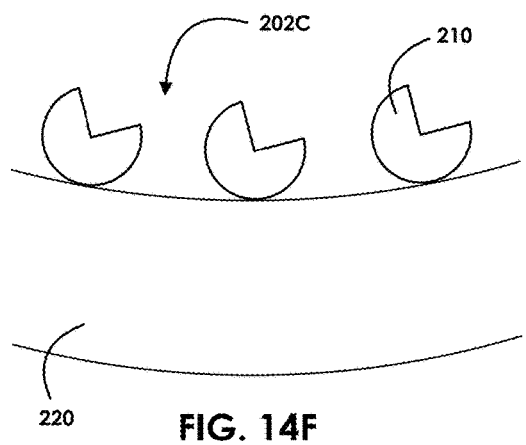
FIG. 14F illustrates a simplified partial side view of the concave configuration of FIG. 14E.

FIGS. 14A-14E illustrate various non-limiting exemplary embodiments of concaves 200G, 200H, and 200I, each having varying configurations with respect their threshing bars 210 and side rails 220. In one embodiment, FIGS. 14A-14B illustrate concave 202G with bars 210 at an acute or obtuse angle relative to side rails 220, wherein bars 210 are shown disposed between and secured to side rails 220. In addition, as shown in FIGS. 14A-14B, the opposing ends 212C of each bar 210 is cut and configured at an angle such that the ends 212C are substantially aligned or "flush" with the interior face of each of side rails 220 of concave 200G. In another embodiment, FIGS. 14C-14D illustrate concave 202H with bars 210 at an acute or obtuse angle relative to side rails 220, wherein bars 210 are shown disposed above and secured to side rails 220. In addition, as shown in FIGS. 14C-14D, the opposing ends 212C of each bar 210 is cut and configured at an angle such that the ends 212C are substantially aligned or "flush" with the exterior face of each of side rails 220 of concave 200H. In another embodiment, FIGS. 14E-14F illustrate concave 202I with bars 210 at an acute or obtuse angle relative to side rails 220, wherein bars 210 are also shown disposed above and secured to side rails 220 of concave 200H. As shown in FIGS. 14E-14F, the bars 210 of concave have their opposing ends 212C at least partially over hanging or protruding outwards relative to side rails 220 of concave 202I.

Here, the concaves and threshing bars of the present disclosure described herein, according to the various embodiments disclosed herein, have gone through experimental testing on various types of crops, namely, grain. The results of the experimental testing are shown in TABLE. 1.

In particular, as shown in TABLE 1, using the concave and disclosed threshing bars of the present disclosure described herein, the threshing bar angle found to be the most effective relative to conventional threshing bar configurations were found to be the supplementary angles of about 83-degree and about 97-degree of each threshing bar within a concave relative to the side rails of the concave, which provided 99.7% threshing efficiency with the least loss of grain at 0.5%, least damage to grain at 0.7%, threshing efficiency to percent loss ratio of 199.4, and a threshing efficiency to percent damage ratio of 252. Here, power efficiency is the normalized unit of power per bushel of threshing. As shown in TABLE 1, there are optimal non-perpendicular angles for the threshing bars relative to the side rails of the concave where the efficiency is the highest and lost and damage are the lowest, thereby demonstrating unexpected results in view of prior conventional threshing bars that are at a 90-degree or perpendicular angle relative to the side rails.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A concave for a combine harvester, the concave comprising:
    a first side support member and a second side support member; and
    a threshing bar secured to the first and second side support members, the threshing bar having a cut-out that extends the length of the threshing bar such that the cut-out defines a first face and a second face for the threshing bar, wherein the threshing bar is at a non-perpendicular angle relative to the first and second side support members; and
    wherein the first and second side support members each comprise a top surface having a first face and a second

TABLE 1

| THRESHING BAR ANGLE RELATIVE TO SIDE RAIL ANGLE CBA (90-degree or less) | SUPPLE-MENTARY ANGLE CBD (90-degree or more) | THRESHING EFFICIENCY (%) | POWER CONSUMP-TION (%) | LOSS (%) | DAMAGE (%) | THRESHING EFFICIENCY TO % LOSS RATIO | THRESHING EFFICIENCY TO % DAMAGE RATIO |
|---|---|---|---|---|---|---|---|
|  |  | 100 | 0 | 0 | 0 | Infinity | Infinity |
| 90 | 90 | 95.0 | 72.7 | 1.9 | 1.2 | 50.00 | 60.58 |
| 87 | 93 | 95.3 | 73.2 | 1.7 | 0.1 | 56.06 | 73.20 |
| 85 | 95 | 96.1 | 73.1 | 1.1 | 0.7 | 87.36 | 104.43 |
| 83 | 97 | 99.7 | 75.6 | 0.5 | 0.3 | 199.40 | 252.00 |
| 79 | 101 | 99.1 | 83.6 | 0.6 | 0.5 | 165.17 | 167.20 |
| 75 | 105 | 97.9 | 88.7 | 2.4 | 1.3 | 40.79 | 68.23 |
| 70 | 110 | 96.0 | 93.6 | 2.8 | 1.8 | 34.29 | 52.00 |
| 65 | 115 | 94.7 | 98.7 | 3.2 | 2.1 | 29.59 | 47.00 |
| 60 | 120 | 93.6 | 99.3 | 3.5 | 2.6 | 26.74 | 38.19 |
| 55 | 125 | 92.4 | 99.4 | 4.1 | 3.5 | 22.54 | 28.40 |
| 50 | 130 | 89.3 | 99.6 | 4.7 | 3.9 | 19.00 | 25.54 |
| 45 | 135 | 86.1 | 99.8 | 5.6 | 4.1 | 15.38 | 24.34 |
| 35 | 145 | 77.3 | 99.9 | 7.1 | 5.2 | 10.89 | 19.21 |
| 25 | 155 | 63.8 | 99.9 | 8.9 | 5.9 | 7.17 | 16.93 | face, wherein the first face and the second face of the first and second side support members substantially axially align with the first face and the second face of the threshing bar.

2. The concave of claim 1, wherein the threshing bar is disposed between the first and second side support members.

3. The concave of claim 1, wherein the threshing bar comprises an angle in the range of about 25-degrees to about 87-degrees relative to the first or second side support member.

4. The concave of claim 1, wherein the threshing bar comprises an angle of about 83-degrees relative to the first or second side support member.

5. The concave of claim 1, wherein the threshing bar comprises an angle of about 87-degrees relative to the first or second side support member.

6. The concave of claim 1, wherein the threshing bar comprises an angle of about 79-degrees relative to the first or second side support member.

7. The concave of claim 1, wherein the first and second face of the threshing bar are of varying dihedral angles.

8. The concave of claim 7, wherein the surface area of the first face of the threshing bar is about 130% larger or about 1.3 times larger relative to the surface area of the second face of the threshing bar.

9. The threshing bar of claim 7, wherein the surface area of the first face of the threshing bar is about 170% larger or about 1.7 times larger relative to the surface area of the second face of the threshing bar.

10. The threshing bar of claim 7, wherein the surface area of the first face of the threshing bar is about 101% to 199% larger or about 1.01 times up to 1.99 times larger relative to the surface area of the second face of the threshing bar.

11. A concave for a combine harvester, the concave comprising:
  a first side support member and a second side support member; and
  a threshing bar secured to the first and second side support members, the threshing bar comprising a channel having a first flat face and a second flat face, wherein the threshing bar is at a non-perpendicular angle relative to the first and second side support members; and
  wherein the first and second side support members each comprise a top surface having a first flat face and a second flat face, wherein the first flat face and the second flat face of the first and second side support members substantially axially align with the first flat face and the second flat face of the channel of the threshing bar.

* * * * *